United States Patent
Kesanupalli et al.

(10) Patent No.: US 6,603,837 B1
(45) Date of Patent: Aug. 5, 2003

(54) METHOD AND SYSTEM TO PROVIDE A GLOBAL INTEGRATED MESSAGING SERVICES DISTRIBUTED NETWORK WITH PERSONALIZED INTERNATIONAL ROAMING

(75) Inventors: Ramesh Kesanupalli, San Jose, CA (US); Sreeram Akella, San Jose, CA (US); Guhan Lakshminarayanan, Milpitas, CA (US); Ramana Krishnamshetty, San Jose, CA (US)

(73) Assignee: Kinera, Inc., Santa Clara, CA (US)

( * ) Notice: Subject to any disclaimer, the term of this patent is extended or adjusted under 35 U.S.C. 154(b) by 0 days.

(21) Appl. No.: 09/955,430

(22) Filed: Sep. 9, 2001

Related U.S. Application Data (60) Provisional application No. 60/231,625, filed on Sep. 11, 2000, and provisional application No. 60/234,695, filed on Sep. 22, 2000.

(51) Int. Cl.[7] .............................. H04M 1/64; H04M 3/00
(52) U.S. Cl. ................ 379/88.17; 379/67.1; 379/88.18; 379/88.22; 379/88.25; 379/908; 379/265.09
(58) Field of Search .......................... 379/67.1, 70, 76, 379/88.04, 88.12, 88.13, 88.17, 88.18, 88.19, 88.22, 88.25, 900, 908, 265.09; 455/432, 433, 436, 445; 709/200, 202, 229, 227; 380/23, 30, 25

(56) References Cited

U.S. PATENT DOCUMENTS

| | | | | |
|---|---|---|---|---|
| 5,497,414 A | * | 3/1996 | Bartholomew | 379/142 |
| 5,675,507 A | * | 10/1997 | Bobo, II | 364/514 R |
| 5,742,905 A | * | 4/1998 | Pepe et al. | 455/461 |
| 5,946,386 A | * | 8/1999 | Rogers et al. | 379/265 |
| 6,069,890 A | * | 5/2000 | White et al. | 370/352 |
| 6,215,858 B1 | * | 4/2001 | Bartholomew et al. | 379/88.17 |
| 6,233,318 B1 | * | 5/2001 | Picard et al. | 379/88.17 |

* cited by examiner

*Primary Examiner*—Allan Hoosain
(74) *Attorney, Agent, or Firm*—Pillsbury Winthrop LLP

(57) ABSTRACT

Systems and methods of cooperating with a telephone exchange to provide a user with centralized access to messages are presented. In accordance with the method, telephone numbers of users are stored. A telephone call is received. The telephone call is forwarded from a telephone exchange. The telephone call has a destination telephone number and originates from a calling party. The destination telephone number is compared with the telephone numbers. If the destination telephone number matches one of the telephone numbers, a user corresponding to the destination telephone number is identified, the calling party is prompted to leave a voice mail message for the user, the voice mail message is stored in a database, and the user is granted access to the voice mail message.

20 Claims, 7 Drawing Sheets

METHOD AND SYSTEM TO PROVIDE A GLOBAL INTEGRATED MESSAGING SERVICES DISTRIBUTED NETWORK WITH PERSONALIZED INTERNATIONAL ROAMING

CROSS-REFERENCE TO RELATED APPLICATIONS

The present application is based on, and claims priority from, U.S. Provisional Application Nos. 60/231,625, filed Sep. 11, 2000, and Ser. No. 60/234,695, filed Sep. 22, 2000.

TECHNICAL FIELD

The present invention relates to communications networks, and, more particularly, to unified messaging and global distribution services to provide personal information to a user at a reasonable cost.

BACKGROUND

People increasingly rely on personal information that they access on a regular basis. The personal information may include professional information that a user uses to conduct their professional life. The personal information may include, or be facilitated by, a wide variety of information services, including sending and receiving messages such as electronic mail, voice mail, or facsimile transmissions, and accessing and updating contact lists, address books, and other applications. The personal information may be stored by any of a variety of wired and wireless telephone carriers, service providers, information portals, and other content providers. Often, the personal information is stored at, and can be only accessed at, disparate locations. Access to this personal information has generally not kept pace with the travel schedules of users of the personal information. A user may spend a great deal of time away from a computer and thus away from easy access to the personal information. For example, the international and national traveler in today's economy can benefit greatly from access to a wide variety of information services.

For international travelers, there is no easy way to access personal information cost effectively. Presently, one conventional way for a user to access the information at the lowest cost is by utilizing a personal computer and by dialing up the local partner network of the user's service provider. Such dial-up access involves paying roaming charges on a per minute usage basis, paying a connection fee to the local provider, and possibly other charges as well. In some instances, it is difficult to get access to a modem line or a local area network (LAN) line or a wireless connection. Depending on the size of the data that a user need to download, a significant cost may be borne by the user. In addition, a user must tolerate the time consuming and cumbersome nature of many information downloads. Moreover, in some countries, the data lines, even when accessed, are not as effective as they are in the United States. Even more important, there are times, towards the end of the day for example, when a user does not want to open up a laptop and connect via the modem lines to access the personal information.

In instances where a traveling user does not speak or read the predominant language in the host country, the situation is even more complicated. Servers at the host country typically do not provide user interfaces in languages other than those of the host country. A service provider's local server may need to reroute the user's browser to a server in a country that provides interfaces in the user's language. This may be an expensive proposition for the user. The service provider may not be able to provide access to the user's personal information at that interface. The user will often pay significant long-distance charges in return for the privilege of getting personal settings along with access to personalized services and applications.

Accordingly, it would be desirable to provide an alternative system that does not suffer from the drawbacks and weaknesses of existing implementations but rather that provides one-stop access to personal information and a host of information services anywhere in the world at any time at a reasonable cost.

SUMMARY

Systems and methods to provide a user traveling to domestic and international locations with unified messaging services, personalized settings, and other information services without dialing up a server over an expensive long distance connection are presented. Access to information services is provided in the traveling user's language, independent of the country in which the user may be situated at the time of access. The systems and methods provide one-stop access to personal information and a host of information services anywhere in the world at any time.

A method of cooperating with a telephone exchange to provide a user with centralized access to messages according to one aspect of the invention is presented. Telephone numbers of users are stored. A telephone call is received. The telephone call is forwarded from a telephone exchange. The telephone call has a destination telephone number and originates from a calling party. The destination telephone number is compared with the telephone numbers. If the destination telephone number matches one of the telephone numbers, a user corresponding to the destination telephone number is identified, the calling party is prompted to leave a voice mail message for the user, the voice mail message is stored in a database, and the user is granted access to the voice mail message.

A method of cooperating with a telephone exchange to provide a user with centralized access to messages according to another aspect of the invention is presented. Facsimile numbers of users are stored. A facsimile call is received. The facsimile call is forwarded from a telephone exchange. The facsimile call carries facsimile data and has a destination facsimile number. The destination facsimile number is compared with the facsimile numbers. If the destination facsimile number matches one of the facsimile numbers, a user corresponding to the destination facsimile number is identified, the facsimile data are formatted into a facsimile message, the facsimile message is stored in a database, and the user is granted access to the facsimile message.

In view of the foregoing, the presently preferred embodiments provide access to information at a reduced cost by consolidating information from various sources and making the information available internationally at the cost of a local telephone call. The embodiments provide the capabilities for information access and information exchange internationally to all users while overcoming barriers of location, bandwidth, and language. The embodiments provide a multi lingual platform and a distributed architecture that can serve as a value-added proposition to any of a variety of information and content providers in the telecommunications, networking, and service provider industries. The embodiments provide a one-stop service for consolidation of all personal information, including professional information if applicable, at one access point and provide access to the information internationally at a reasonable cost.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

Copending U.S. applications Ser. No. 09/955,492, Ser. No. 09/955,431, Ser. No. 09/955,421, Ser. No. 09/955,423, Ser. No. 09/955,511, all filed concurrently herewith and entitled METHOD AND SYSTEM TO PROVIDE A GLOBAL INTEGRATED MESSAGING SERVICES DISTRIBUTED NETWORK WITH PERSONALIZED INTERNATIONAL ROAMING, and any divisional or continuation applications proceeding therefrom these five applications, are all hereby incorporated by reference herein.

A mobile information exchange (MIE) system according to an aspect of the present invention is presented. The MIE system makes the access and exchange of information possible at the lowest cost internationally. The MIE system provides the ability to exchange a wide variety of, and, theoretically, any kind of, information globally at the lowest possible cost at any time.

Exemplary MIE system architectures are presented that are very highly scalable and that are highly distributed. The MIE system has various components that work together in a collaborative environment from various parts of the globe with different partners in different regions.

The presently preferred embodiments provide access to information at a reduced cost by consolidating information from various sources and making the information available internationally at the cost of a local telephone call. The embodiments provide the capabilities for information access and information exchange internationally to all users while overcoming barriers of location, bandwidth, and language. The embodiments provide a multi lingual platform and a distributed architecture that can serve as a value-added proposition to any of a variety of information and content providers in the telecommunications, networking, and service provider industries. The embodiments provide a one-stop service for consolidation of all personal information, including professional information if applicable, at one access point and provide access to the information internationally at the lowest cost possible.

In addition to providing one-stop access to information globally, the MIE system stores information locally relative to users of the information so that cost, bandwidth, and language barriers are surmounted to provide reliable and available access to information via a common telephonic device such as a telephone or a computing device such as a computer with a Web browser.

Technology pieces described herein such as unique on-demand distribution, global-information roaming, multi-lingual capabilities, highly-distributed architecture, notification technology, and Internet Protocol (IP) technology are infrastructure pieces of the MIE system. The infrastructure pieces are integrated in a distributed environment to provide the global information access and exchange capabilities at the lowest possible cost. Depending on the implementation, the hardware and network infrastructure required to run the global network embodiments described here can be achieved through local partnering with various partners geographically. Depending on the implementation, partner infrastructure may encompass anywhere from zero to one hundred percent of the MIE system. An advantage of employing existing partner infrastructure in the implementation of the MIE system is that the partners have an existing customer base to which the services of the MIE system can be provided and targeted.

The present invention will now be described in detail with reference to the accompanying drawings, which are provided as illustrative examples of preferred embodiments of the present invention.

Figure 1:
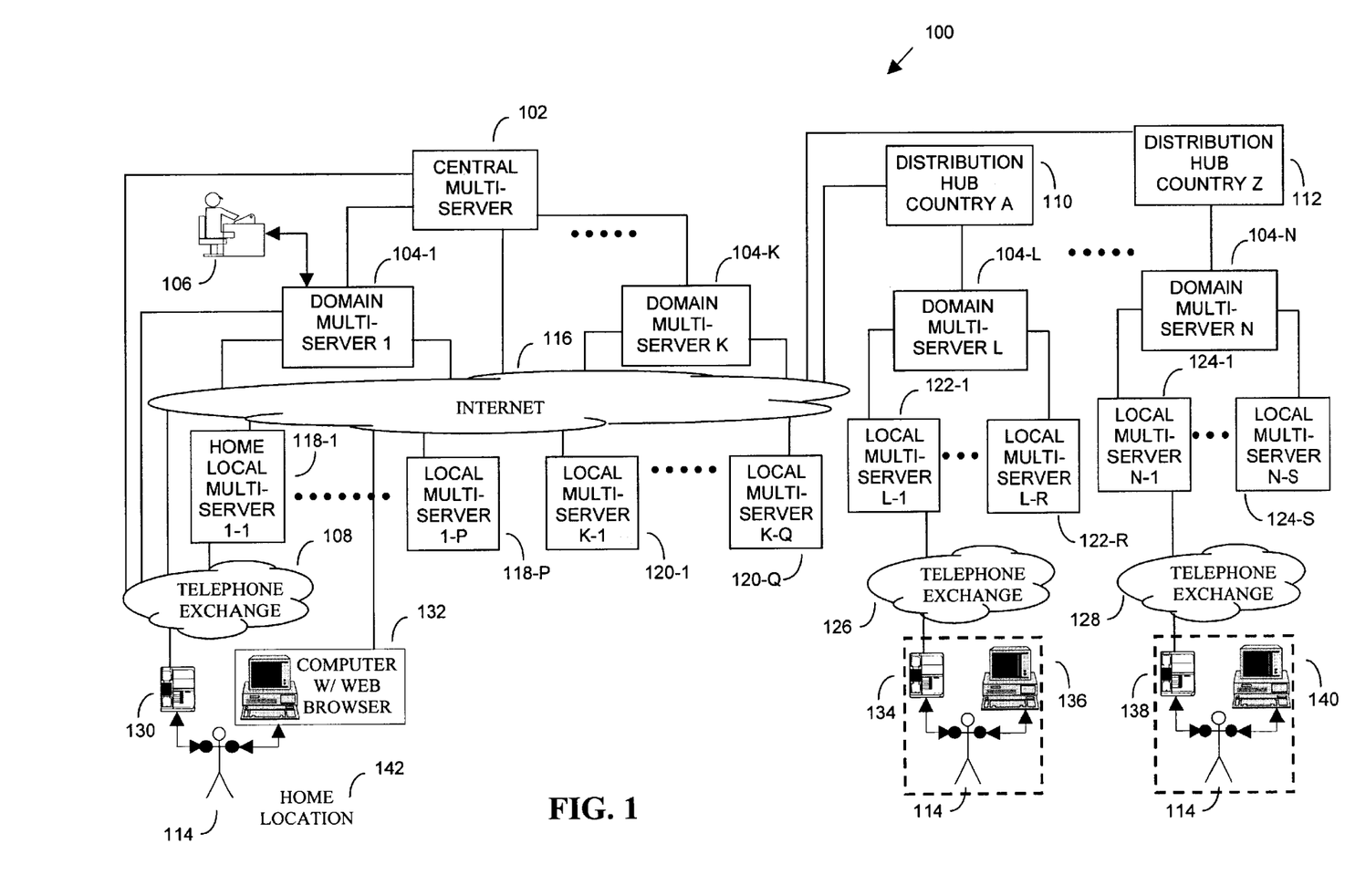
FIG. 1 is a block diagram illustrating the structure of an exemplary multi-tiered global distribution system according to a presently preferred embodiment.

Referring now to FIG. 1, it is a block diagram illustrating the structure of an exemplary multi-tiered global distribution system 100 according to a presently preferred embodiment. The exemplary global distribution system 100 includes a central multi-server 102, a series of domain multi-servers 104-1 . . . 104-K, 104-L, 104-N, a distribution hub 110 for a country A, a distribution hub 112 for a country Z, and a series of local multi-servers 118-1 . . . 118-P, 120-1 . . . 120-Q, 122-1 . . . 122-R, 124-1 . . . 124-S. The central multi-server 102 connects to the local multi-servers 1-1 118-1 through 1-P 118-P via the domain multi-server 1 104-1 and the Internet 116. The local multi-servers 1-1 118-1 through 1-P 118-P belong to the domain 1 of the domain multi-server 1 104-1. The central multi-server 102 connects to the local multi-servers K-1 120-1 through K-Q 120-Q via the domain multi-server K 104-K and the Internet 116. The local multi-servers K-1 120-1 through K-Q 120-Q belong to the domain K of the domain multi-server K 104-K. The central multi-server 102 connects to the distribution hub 110 for country A via the Internet 116. Country A can be India, for example, although it should be understood that country A may represent any of a variety of countries, including China, the United Kingdom, Germany, etc. The central multi-server 102 connects to the distribution hub 112 for country Z via the Internet 116; Country Z can be India, for example, although it should be understood that country Z may represent any of a variety of countries, including China, the United Kingdom, Germany, etc. In other embodiments, a distribution hub such as one of the distribution hubs 110, 112 of FIG. 1 services an entire region or an entire continent that encompasses several countries, for example, Europe, Asia, Latin America, etc., rather than a single country. Although two distribution hubs 110, 112 are illustrated in FIG. 1, generally there may be any number of distribution hubs to service countries, regions, continents or other areas of the world. Similarly, with a single country, region, continent, or other area of the world, generally there may be any number of distribution hubs to provide service. The distribution hub 110 for country A connects to the local multi-servers L-1 122-1 through L-R 122-R via the domain multi-server L 104-L. The local multi-servers L-1 122-1 through L-R 122-R belong to the domain L of the domain multi-server L 104-L. Although one domain multi-server 104-L is illustrated for the distribution hub 110, any number of domain multi-servers with any number of local multi-servers may be used as suitable. The distribution hub 112 for country Z connects to the local multi-servers N-1 124-1 through N-S 124-S via the domain multi-server N 104-N. The local multi-servers N-1 124-1 through N-S 122-S belong to the domain N of the domain multi-server N 104-N. Although one domain multi-server 104-N is illustrated for the distribution hub 112, any number of domain multi-servers with any number of local multi-servers may be used as suitable.

The central multi-server 102 is preferably located in the United States, although it should be understood that the operations center may be located elsewhere than the United 20 States and any central multi-server may be located where suitable. Similarly, the domain multi-servers 1 104-1 through K 104-K are preferably located within the United States, but may be located elsewhere as suitable.

An administrator 106 connects to the central multi-server 102 to configure and manage the central multi-server 102. In a preferred embodiment, the administrator 106 is physically located at a central multi-server 102 terminal, although of course the administrator 106 may connect in any suitable, and preferably data-secure, fashion to the central multi-server 102, such as via a LAN connection, or via a modem dial-up telephone connection, for example.

A user 114 having access to a telephonic device 130 such as a telephone 130 and a computing device 130 such as a computer 132 is capable of connecting to the global distribution system 100 via the Internet 116 or a local telephone exchange 108. Most particularly, the user 114 will connect to the local multi-server 1-1 118-1 of the global distribution system 100, although of course the user 114 has the capability, if granted appropriate access, to access any of the multi-servers of the system 100 as suitable. In the examples described herein the user 114 connects to a local multi-server such as local multi-server 1-1 118-1 from a home location 142. For ease of explanation, the home location 142 as well as the local multi-server is assumed to be within the United States. Of course, the home location of the user 114 may be located anywhere suitable outside of the United States as well.

Similarly, assuming that the user 114 travels to country A and has access to a telephone 134 and a computer 136, or one or the other of these, the user 114 is capable of connecting to the global distribution system 100 via, for example, the Internet 116 or a local telephone exchange 126, or a combination of these. Most particularly, the user 114 will connect to the local multi-server L-1 122-1 of the global distribution system 100, although of course the user 114 has-the capability, if granted appropriate access, to access any of the multi-servers of the system 100 as suitable.

In similar fashion, assuming that the user 114 travels to country Z and has access to a telephone 138 and a computer 140, or one or the other of these, the user 114 is capable of connecting to the global distribution system 100 via, for example, the Internet 116 or a local telephone exchange 128, or a combination of these. Most particularly, the user 114 will connect to the local multi-server N-1 124-1 of the global distribution system 100, although of course the user 114 has the capability, if granted appropriate access, to access any of the multi-servers of the system 100 as suitable.

The central multi-server 102 oversees the domain multi-servers 104-1, . . . , 104-K, 104-L, . . . , 104-N. and is responsible for distributing user 114 information among the domain multi-servers. From the perspective of each domain, there is one central multi-server 102 and one domain multi-server per domain. Of course, the central multi-server 102 is a member of more than one domain. The user 114 registers on a domain multi-server for service. Each domain multi-server is responsible for distributing user 114 information among the local multi-servers within the domain. The home local multi-server, in this case home local multi-server 1-1 118-1, is a user 114 specified local multi-server where a user's 114 data, such as electronic mails, address books, and user preferences, are stored and maintained. Preferably, at the time of registration, the user 114 identifies one local multi-server as the user's 114 home multi-server.

Figure 2:
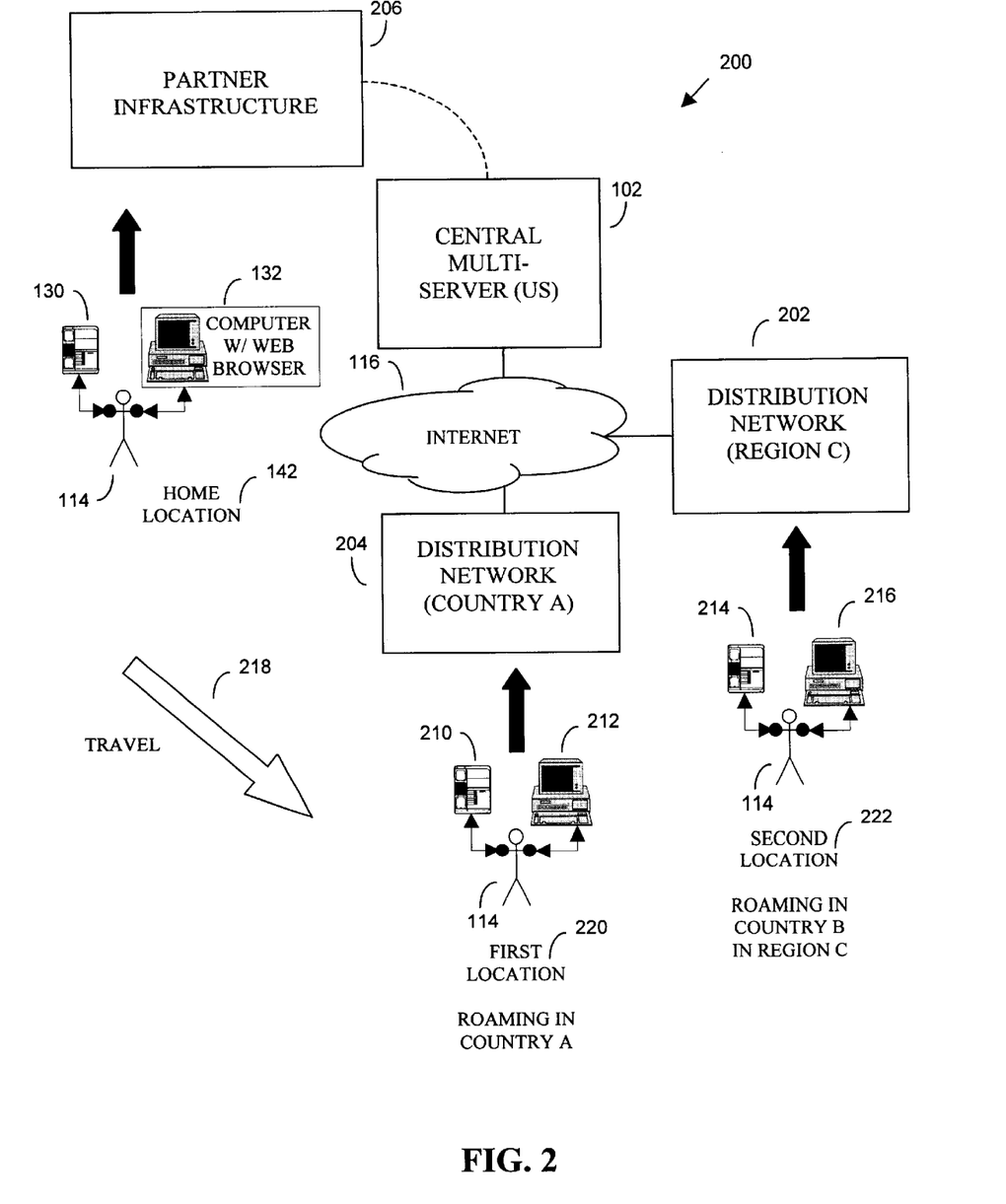
FIG. 2 is a block diagram illustrating the structure of an exemplary multi-tiered global distribution system incorporating partner infrastructure according to a presently preferred embodiment.

Referring now to FIG. 2, it is a block diagram illustrating the structure of an exemplary multi-tiered global distribution system 200 incorporating partner infrastructure 206 according to a presently preferred embodiment. The exemplary global distribution system 200 includes the central multi-server 102, a distribution network 204 for the country A, a distribution network 202 for a region C, and partner infrastructure 206.

The central multi-server (US) 102 is preferably located in the United States, although it should be understood that the operations center may be located elsewhere than the United States and any central multi-server may be located where suitable. Similarly, the partner infrastructure 206 is assumed to be located in the United States, although it should be understood that partner infrastructure may be located elsewhere than the United States, within the United States, or located in a variety of global areas including the United States. It should be understood that, depending on the implementation, partner infrastructure may encompass anywhere from zero to one hundred percent of the global distribution system 200, the Internet 116, or any telephone exchange such as telephone exchanges 108, 126, 128 of FIG. 1. For example, although in FIG. 2 the central multi-server 102 and the distribution networks 202, 204 are illustrated as distinct from the partner infrastructure 206 for the purposes of the example, they themselves may include, or be included as part of, partner infrastructure.

The user 114 at a home location 142 is capable of connecting to the partner infrastructure 206 via a telephonic device such as a telephone 130, via a computing device such as a computer 208, or via both, as suitable for the particular applications supported by the partner infrastructure 206. Preferably, the partner infrastructure 206 includes a local multi-server such as the local multi-server 1-1 118-1. The partner infrastructure 206 may also include entities that do not directly correspond to the multi-servers illustrated in FIG. 1, but that provide some service or application that the user 114 is capable of accessing via the telephone 130 or the computer 132, or both.

The exemplary system 200 of FIG. 2 provides access to a traveling user such as user 114 given a series of conditions, such as registration of the user with the system 200 in some capacity, confirmation of the identity of the user 114, or other conditions as suitable.

In the example illustrated in FIG. 2, the user 114 travels 218 to a location such as a first location 220 in the country A where the user 114 is said to be roaming. Under certain access conditions, the user 114 is capable of connecting to the distribution network 204 for country A via a telephone 210 or a computer 212, or both.

Similarly, in the example illustrated in FIG. 2, the user 114 travels 218 to a location such as a second location 222 in the country A located in the region C where the user 114 is said to be roaming. Under certain access conditions, the user 114 is capable of connecting to the distribution network 202 for region C via a telephone 214 or a computer 216, or both.

Depending on the implementation, the hardware and network infrastructure required to run the global network embodiments described here can be achieved through local partnering with various partners geographically. Depending on the implementation, partner infrastructure may encompass anywhere from zero to one hundred percent of the MIE system. Preferably, partners for the MIE system are identified in various geographical locations and assist with collaborative launch of the system. The partner infrastructure, to the extent that the infrastructure includes the multi-servers, will form the backbone to route the information to particular global destinations.

In an exemplary user scenario that is becoming increasingly typical, a user may have an account with a Web portal where the user has personal email, and possibly a personalized home page that the user may view. Some examples of these Web portals are Yahoo (URL: myYahoo.com), Excite (URL: myExcite.com, Microsoft Network (MSN) (URL: MSN.com). The user also may have an account with an Internet service provider (ISP) such as America Online (AOL) or MSN. In addition, the user may have a voice mail message box with a cellular phone service provider, a voice mail message box with the user's local telephone company, an account with a service provider for facsimile and voice mail messages, and an account with a personal information consolidation portal.

With the presently preferred embodiments, the exemplary user 114 is able to access, for example, personal home pages from Web portals such as Yahoo and Excite, personal information from a personal information consolidation portal, voice mail messages from providers such as Cellular One, Pacific Bell, and Sprint PCS, electronic mail messages from service providers such as AOL and MSN, and facsimile messages from service providers such as Onebox and eFax. while traveling, through a normal telephone.

A user 114 having an account in the MIE system will generally have access to information such as voice mail messages, electronic mail messages, facsimile messages, personal home pages with attendant preferences, and corporate information, for example. Although any companies may partnered with as suitable to implement the MIE system, certain typical pairing can be identified. In the case of voice mail messages, the partner infrastructure 206 of the exemplary multi-tiered global distribution system 200 of FIG. 2 typically includes telecommunication company infrastructure. For electronic mail messages, the partner infrastructure 206 typically includes ISPs. For facsimile messages, the partner infrastructure 206 typically includes value add service providers. For corporate or information, the partner infrastructure 206 includes the corporations utilizing the corporate information.

An advantage of employing existing partner infrastructure 206 in the implementation of the MIE system is that the partners have an existing customer base to which the services of the MIE system can be provided and targeted. In order to reach the very large numbers of customers and subscribers through the partner infrastructure 206 companies, the value add partnering is preferably-of a seamless and effortless nature for the partners and the subscribers.

Some exemplary scenarios describing possible interrelationships between partners and the partnering infrastructure 206 and the MIE system are now presented.

Information Exchange: Telecommunication/Wireless Companies

Nearly all cellular phone companies offer voice mail service. Users typically are not able to receive their voice mails as they are traveling. The presently preferred embodiments preferably provide this service to users in the places where the users are traveling. In an exemplary scenario, cellular and local telephone companies enter into partnering arrangements with the MIE company. The partners, i.e., the cellular and local telephone companies, would provide account numbers and passwords of their users to the central multi-server 102. According to the example, and referring to FIG. 1, a traveling user 114 then would travel to a remote city in country A. Once there, the user 114 would make a local telephone call via telephone 134 to, for example, the local multi-server L-1 122-1 and would input their account number and password. The local multi-server L-1 122-1 would recognize that the user 114 was roaming, and would ask if the user 114 wants to receive voice mail messages locally. The user 114 responds in the affirmative, and the local multi-server L-1 122-1 would inform the central multi-server 102. The central multi-server, in turn, would inform the partner infrastructure 206 phone company about roaming user 114. All voice mail messages from that point onwards would be forwarded to the central multi-server 102, which would then forward the messages to the local multi-server L-1 122-1. As long as the user 114 stays in the remote city in country A, the voice mail messages would always be available locally. Continuing with the example, the user 114 travels to a different city, this time in country B. A similar process ensues between, for example, the local multi-server N-1 124-1, the central multi-server 102, and the partner infrastructure 206 phone company, so that the user's 114 voice mail messages are available at the local multi-server N-1 124-1. Finally, the user 114 returns home to their home city and calls the home local multi-server 1-1 118-1 on the telephone 130. At this point, the roaming would be turned off, preferably automatically based on the receipt of the telephone call, from the user 114. Preferably, the process of making voice mail messages available locally to a roaming user 114 only happens once during a user's 114 stay in any given location. Once the roaming is set, the voice mail messages are preferably automatically available locally.

Of course, if the user 114 goes online and informs the central multi-server 102 that the user 114 will be roaming during particular dates or beginning on a particular date, the central multi-server 102 will arrange for the voice mail messages to be available locally according to the schedule or the date provided by the user 114, as described below. In this way, the user 114 would not have to go through the process described above while roaming.

Information Exchange: Portal Companies

In a typical day, the usual information that a user 114 wants to stay on top is their home page; which might contain, for example, the latest news head lines, technology news, business and financial information, horoscopes, etc. These home pages are typically provided by portals like Yahoo, Excite, MSN, AOL, etc. The presently preferred embodiments preferably offers a telephony interface to this information internationally at a local telephone cost by storing.the profile of the user. In another exemplary scenario, Web portal companies enter into partnering arrangements with the MIE company. The partners, i.e., the Web portal companies, would provide account numbers and passwords of their users to the MIE central multi-server 102. According to the example, and referring to FIG. 1, a traveling user 114 then would use their Web browser on the computer 132 to access their home page. The user 114 would select a roaming option, and then would select their roaming cities from the home page, or, for example, from the MIE system via routing from the home page. The central multi-server 102 informs the partner Web portal company that the user's 114 electronic mail messages and-voice mail messages are to be forwarded to the MIE system. The user 114 then travels to a remote city in country A. Once there, the user 114 would make a local telephone call via telephone 134 to, for example, the local multi-server L-1 122-1 and would input their account number and password. The electronic mail messages and the voice mail messages would be available from the local multi-server L-1 122-1. Preferably, at the user's 114 request, the home page of the user 114 would be accessed with the user's 114 profile and would be available locally for information access.

Info Exchange: Service Providers, Consolidators

Many people have accounts with ISPs. Many such companies pursue a centralized data repository approach. When the user 114 is traveling, however, the user 114 needs to have access to information locally so that the user 114 can have access that is at a reasonable cost, is less problematic, and is less time consuming. The MIE system preferably provides added value to the ISP by providing roaming users 114 with local access that is efficient and cost effective.

In the case of content management and consolidation of personal information sites like Yodlee, the MIE company preferably partners with these companies to offer effective global access to information through local calling. For these companies, most personal information tends to be consolidated from various accounts and access is provided to that consolidated information. By partnering with the MIE system the consolidated information can be available at a reasonable cost anywhere globally.

Enterprise and corporate customers of the MIE company can also forward information to the MIE system to aid in cost-effective connectivity to and efficient global availability of the information.

Partnering with service providers, consolidators, and enterprise companies is similar to the methodology described above with respect to the telecommunication/wireless companies and the Web portal companies. The service providers, consolidators, and enterprise companies would enter into partnering arrangements with the MIE company and would provide account numbers and passwords of their users to the central multi-server 102. Of course, the MIE system could also issue its own account number and password for access via the service provider's service. The service providers would forward electronic mail messages, voice mail messages and/or other information to the central multi-server 102. The central multi-server will ensure the global access and distribution of the information to users 114 at their location, whether at a home location 142 or at a roaming location 220, 222.

In all the information exchange scenarios, the users 114 have the flexibility to provide their local contact numbers in the roaming cities, so that the users 114 will be notified by the MIE levels of multi-servers about the information through MIE rule-based alerts and MIE notification technology.

In a presently preferred embodiment, users 114 can consolidate all of their information to a single unique MIE system account so that the MIE system can provide the global access and delivery of that information at a reasonable cost. The MIE system preferably employs integrated IP telephony technology as described in more detail below so that when the user 114 is online accessing their information, the user 114 will preferably be able to connect in real time to other users 114 cost effectively through the MIE collaborative network.

In a presently preferred embodiment, connection to the MIE network is organized generally as follows. Initially, a user 114 is set up on, or registered with, the MIE network via the Internet 116 and the Web and the client computer 132. Preferably, the user 114 contacts the domain multi-server, for example, domain multi-server 1 104-1 for user 114 registration and user 114 account creation. At user 114 registration a local multi-server, in 10 this case the home local multi-server 1-1 118-1, is designated for the user 114. The user 114 also preferably contacts the domain multi-server 1 104-1 for redirection to the home local multi-server 1-1 118-1. Once registered as a user 114 with the MIE network, the user 114 may use the telephone 130 or the client computer 132 via the Internet 116 to connect to the MIE network.

For connection to the MIE network via the telephone 130, the user 114 is given a telephone number for the designated home local multi-server 1-1 118-1. Preferably, the user 114 is only permitted to call the home local multi-server 1-1 118-1 for telephone 130 access to the MIE network, unless the user 114 is traveling or roaming. The user 114 enters a numeric password via, for example, discrete-tone multi-frequency (DTMF) input on the telephone 130 for authentication on the MIE system.

For connection to the MIE network via the client computer 132 and the Web, the user 114 normally connects to the domain multi-server 1 104-1. The user 114 enters a username and a password at a Web interface such as the Web browser on the client computer 132 for authentication on the MIE system. The password is preferably not the same password as that used for authentication over the telephone 130. If the user 114 connects to the domain multi-server 1 104-1 as is typical, the user 114 will log onto to the domain multi-server 1 104-1 and then the user 114 will be redirected to the home local multi-server 1-1 118-1. If the user 1-14 connects to the home local multi-server 1-l 118-1, the user 114-is redirected to the domain multi-server 1 104-1 for log in. Next, the user 114 logs in and is redirected to the home local multi-server 1-1 118-1.

Instead of storing all of the information regarding users 114 on the MIE network in one large database at the central multi-server 102 or at the domain multi-servers 104-1, . . ., 104-K, the system 100 employs load balancing and stores a user's 114 personal information locally on the designated home local multi-server 1-1 118-1 of the user 114.

Figure 3:
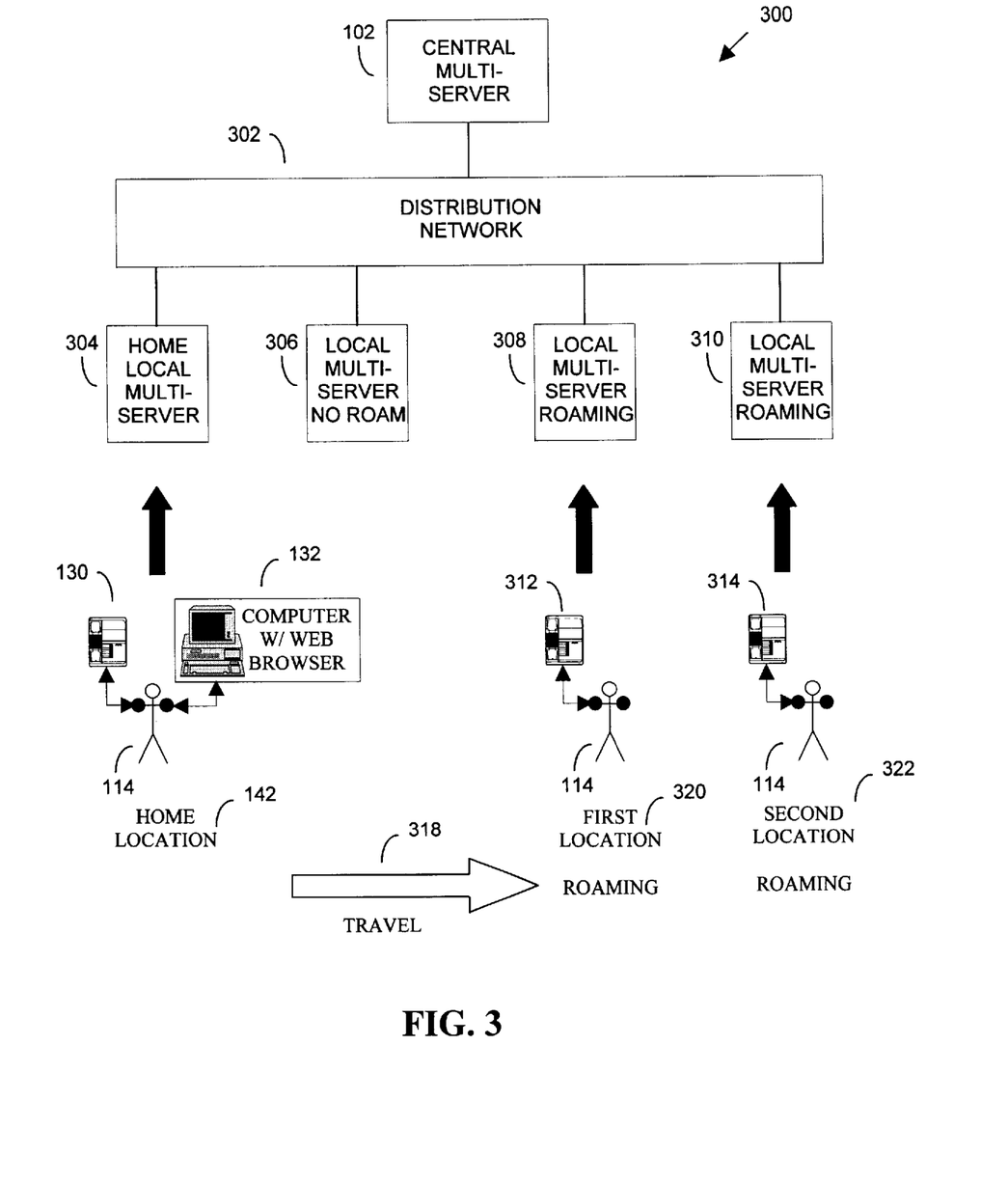
FIG. 3 is a block diagram illustrating a simplified exemplary system analogous to the exemplary system of FIG. 1 from a communications flow perspective during user roaming.

Referring now to FIG. 3, it is a block diagram illustrating a simplified exemplary system 300 analogous to the exemplary global distribution system 100 of FIG. 1 from a communications flow perspective during user 114 roaming. The central multi-server 102 communicates with, for example, a home local multi-server 304, and local multi-servers 306, 308, 310 via a distribution network 302. The home local multi-server 304 can be, for example, the home local multi-server 1-1 118-1 of FIG. 1. The user 114 communicates with the home local multi-server 304 from a home location 142 using either the telephone 130 or the client computer 132. According to a communications flow example, the user 114 travels 318 to a first location 320 and while roaming in the first location 320 connects to the local multi-server 308 via a telephone 312 to access personalized user 114 messages and information from the MIE network. Similarly, the user 114 roams in the second location 322 and connects to the local multi-server 310 to access personalized user 114 messages and information from the MIE network. The user 114 does not roam in the area of the local multi server 306.

Figure 4:
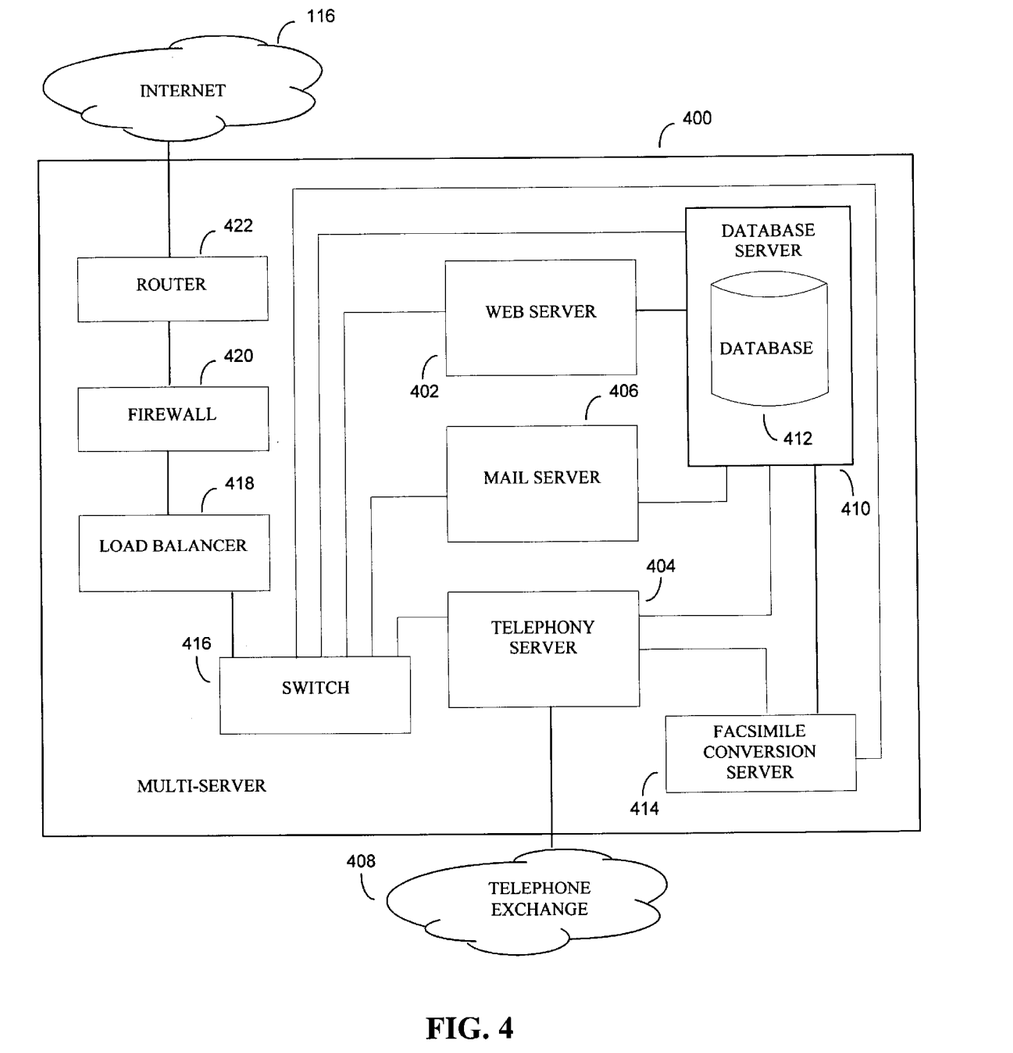
FIG. 4 is a block diagram illustrating the structure of an exemplary multi-server according to a presently preferred embodiment and in accordance with FIG. 1, FIG. 2, and FIG. 3.

Referring now to FIG. 4, it is a block diagram illustrating the structure of an exemplary multi-server 400 according to a presently preferred embodiment and in accordance with FIG. 1, FIG. 2, and FIG. 3. The exemplary multi-server 400 preferably includes a Web server 402, a telephony server 404, a mail server 406, a database server 410 that includes a database 412i a facsimile conversion server 414. A switch 416 connects the various servers 402, 404, 406, 410, 414 to the Internet 116 via a load balancer 418, a firewall 420, and a router 422. The telephony server 404 is connected to an exemplary telephone exchange 408. The database server 410 communicates with the Web server 402, the mail server 406, the telephony server 404, and the facsimile conversion 10 server 414. In particular, the database server 410 is preferably separate from the Web server 402 and the telephony server 404.

The Web server 402 includes functionality, such as, for example, server pages such as Java server pages, servlets, a HyperText Markup Language (HTML) file system, and database access. The mail server 406 preferably includes electronic mail functionality, such as, for example, compliance with the Simple Mail Transfer Protocol (SMTP) and the Post Office Protocol 3 (POP3), and database access. The telephony server 404 preferably includes computer and telephony functionality, such as, for example, computer telephony interface (CTI) server capability, facsimile server capability, a Voice Operated Exchange (VOX) file system, notification capability, Internet Protocol (IP) telephony capability, text to speech (TTS) conversion engine capability; automatic speech recognition (ASR) arid interactive voice response (IVR) capability, and database access.

As used herein, the term multi-server is intended broadly to encompass at least one server that offers a variety of functionality; For example, in a presently preferred embodiment, each multi-server, local, domain, and central offers Web server, telephony server, mail server, facsimile server, database server functionality. For scalability and performance, preferably the telephony server and the Web server, for example, will not be contained as the same server, although the telephony server and the Web server may be one and the same server, as suitable. Although in a presently preferred embodiment, the central, domain, and local multi-servers of FIGS. 1–3 are organized similarly to the exemplary multi-server 400, the multi-servers of FIGS. 1–3 can be organized in a different fashion, and can include more or less network elements as suitable. The MIE company may provide the multi-server infrastructure, or may partner with service providers and other organizations to provide the infrastructure.

Redirection

A centralized database for keeping user information works well enough for serving Web users from one central server. However, a centralized database system often requires some subscribers to make long distance calls to access their messages over the telephone, which can be an expensive proposition for the subscribers.

One of the possible approaches to solve this problem is to store the message data at a central location and have a subsidiary multi-server access the central database over the Internet. A problem with this approach is, for example, that the connection between the telephony server of the subsidiary server and the database over the Internet could be unreliable and slow compared to the response time expectations of a typical- telephone user.

Preferably, the MIE network is organized so that users 114 select their location of choice from among a group of available service locations at the time of user 114 registration. The MIE system then arranges for the message data for each user 114 to be stored in a database 412 that is local to the telephony server 404 of the local multi-server 400 at the user's 114 location of choice. This way, users 114 can access their message data inexpensively and easily while the storage and data traffic throughout the MIE network is balanced.

Referring again to FIG. 1, at registration the user 114 communicates with the domain multi-server 1 104-1 via the Internet 116 using the computer 132. The user 114 attempts to sign up for service on the MIE network. The user 114 is presented with a list of local multi-servers 1-1 118-1, . . . , 1-P 118-P. The user 114 selects the local multi-server 1-1 118-1 as the user's home multi-server. In this way, the MIE system is capable of providing the user 114 with access to user 114 data using a local telephone such as telephone 130 from the user's 114 home city and home location 142. The domain multi-server 1 104-1 verifies that the userid or username that the user 114 is requesting is not in use and a user 114 account is created on the home local multi-server 1-1 118-1.

Once registered on the MIE network, for regular log on via the Web and the Internet 116, the user 114 goes to the domain multi-server 1 104-1. At the domain multi-server 1 104-1, the user's 114 userid and password are authenticated. Once the user's 114 userid and password are validated, the domain multi-server 1 104-1 redirects the user's 114 Web browser to the user's 114 home local multi-server 1-1 118-1. From that point on in that user 114 session, the user 114 interacts with the home local multi-server 1-1 118-1.

Roaming

People who travel domestic and internationally are typically unable to check electronic and voice mail messages inexpensively. Typically a person must place a long distance call in order to get access to this information. The MIE system provides roaming features so that a roaming user 114 is granted access to user 114 personal information and messaging with a local telephone call, preferably anywhere in the world.

Preferably, the MIE network is organized so that a user 114 can set up the MIE network roaming features proactively through the user's 114 Web browser on the client computer 132 or the roaming features may be activated automatically via the telephone 130 when the user 114 calls for the first time from a roaming city.

At any given time, if the user 114 is in a city other than the user's 114 roaming city, when the user 114 calls a MIE system multi-server with, for example, POP functionality, for the access, assuming the user 114 has not already set up the roaming before, when the user 114 calls in, the user 114 account information will be validated in the MIE system distribution hub. Then, the user 114 is preferably directed to hang up the telephone. The POP functionality of the MIE system will redirect the new information from the user's 114 home local multi-server 1-1 118-1 to the roaming city from that point onwards, until the point at which the user 114 access the user 114 information from a different location. If the user 114 returns to his/her home location 142 and accesses the user 114 information through telephone on the user's 114 home local multi-server 1-1 118-1 the roaming will be automatically turned off. At any given location, so long as the access is done through the same multi-servers, the user 114 preferably needs only to call and hang up only once during the user's 114 stay at the location to initiate roaming at that location. When the user 114 goes to a different location and calls the local multi-server for that location, then for the next time that the user 114 needs to call the local multi-server, the MIE network will take care of making the user 114 information available. If the user 114 set up roaming before hand through a Web interface to the MIE system such as the user's 114 Web browser, the user's 114 information will be automatically forwarded to the user's 114 location of choice according to the schedule provided by the user 114. Again, when the user 114 reaches the home local multi-server 1-1 118-1, roaming could be turned off according to the schedule, or the user 114 can simply turn roaming off automatically with a local telephone call.

Referring to FIGS. 1 and 3, the central multi-server 102 oversees the domain multi-servers within the distribution network 302 and is responsible for distributing user 114 information, such as the user's 114 mini-profile, among the domain multi-servers and throughout the distribution network 302. The term mini-profile is intended broadly to refer to information specific to a user that is grouped for distribution throughout a network. In general, the user 114 information stored within a user's 114 mini-profile can be any of a variety of user 114 information as suitable, although in a presently preferred embodiment the mini-profile of a user 114 includes the user's 114 first name and last name, as well as the user's 114 voice greeting, locale identifier (locale id), and multi-server id. A user's 114 language and country information are collectively referred to as the locale id. Preferably, the multi-server id indicates the designated home local multi-server of the user 114.

The user 114 registers on a domain multi-server for service. Each domain multi-server is responsible for distributing user 114 information such as the user's 114 mini-profile among the local multi-servers within the domain. The home local multi server, in this case home local multi-server 304, is a user 114 specified local multi-server where a user's 114 data, such as electronic mails, address books, and user preferences, are stored and maintained. Preferably, at the time of registration, the user 114 identifies one local multi-server as the user's 114 home multi-server 304.

In order to support personalized content while the user 114 is roaming to a local system, user interface screens are provided for a server administrator to be able to create server-data information in different languages. Domain-specific server data, that is data that are not specific to any particular user 114, are created and distributed to local multi-servers throughout and within particular domains. In a presently preferred embodiment, the server data includes languages supported within the domain; currencies supported; messages in various languages to be displayed to users 114; keyword strings in various languages, identifying for example, mail priority, and system folders. The server-data may also include the local server's default locale, domain name, and the domain server name to which it belongs.

Referring to FIG. 1, the administrator 106 enters server data at an interface to the domain multi-server 1 104-1. The server data is then distributed from the domain multi-server 1 104-1 to the local multi-servers 1-1 118-1 through 1-P 118-P so that each local multi-server 1-1 118-1 through 1-P 118-P has language specific strings in each of the languages known to the local multi-servers. Preferably, the server data are also distributed from the domain multi-server 1 104-1 to the central multi-server 102 and thereon to the other domain multi-servers, including the domain multi-server K 104-K, as well as to the distribution hubs 110, 112 in other countries or regions, and so on to the local servers in the different domains throughout the global distribution network 100.

The mini-profile for a user is also distributed to each multi-server within the global distribution network 100 so that actions can be performed from each multi-server, such as for example, responding to an e-mail sent to a user 114 with the personal greeting of the user 114. Referring to FIG. 1, a user 114 registers at the domain multi-server 1 104-1 via the Internet 116 and the client computer 132. The user 114 selects the local multi server 1-1 118-1 as his/her home local multi-server. As described above, the domain multi-server 1 104-1 registers the user 114 and creates a user 114 account for the user 114. The domain multi-server 1 104-1 creates and distributes a mini-profile for the user 114 to the local multi-servers 1-1 118-1 through I-P 118-P, to the central multi-server 102, and so on throughout the global distribution network 100. The user's 114 Web browser is redirected to the home local multi-server 1-1 118-1 and the user 114, can modify and edit the mini-profile that is displayed to the user 114. The modified user 114 mini-profile is then forwarded to the domain multi-server 1 104-1, which then distributes the modified mini-profile throughout the global distribution network 100.

When the user 114 is roaming, the user 114 is allowed to access their personal information, such as their address book, signature, and other settings. According to a presently preferred embodiment, and referring to FIG. 3, a user 114 initiates a request, ultimately to the home local multi-server 304, to make the user's 114 messages available at a first location 320 and a second location 322. The user 114 specifies a time period, for example two weeks, that the user will be traveling. Preferably, the user 114 specifies the start and end dates of travel and local multi-servers 308, 310 corresponding to the first and second locations 320, 322 are assigned to the user 114 for appropriate portions of the roaming time.

The user 114 preferably provides the MIE system with an itinerary that details when an where he/she will be roaming so that the system can begin to distribute the user's 114 roaming profile and messages, such as e-mail messages. The home local multi-server 304 distributes the user's 114 roaming profile, that is, the user's 114 personalized information and settings, to all of the local multi-servers the user 114 is roaming to, that is, the local multi-servers 308,310. Since the user it is not roaming in the location of the local multi-server 306, no roaming profile, and no messages, are forwarded to the local multi-server 306 at this time.

The MIE system makes copies of the user's personal data and messages and distributes the copies to the specified locations for the duration of the roaming. When a message, for example an e-mail message, arrives for the user 114 at the home local multi-server 304, the message is saved. If the user 114 is roaming, then the home local multi-server forwards copies of the message to the roamed local multi-servers 308, 310 via the distribution network and the central multi-server 102.

The user 114 travels 318 to the first location 320 and can access his/her messages locally by making a local telephone call to the local multi-server 308 via the telephone 312. When a mail is read or heard to by the user 114 on any multi-server, either the home 304 or the roamed local multi-servers 308, 310, that mail is marked read on all the other roamed or home multi-servers as applicable. A mail activity log is created by recording and distributing the roaming user's 114 mail activities. User 114 actions in the roamed 322, 320 and home locations 142 are recorded and played back at other roamed or home locations as applicable. The same logic is also applied for activities such as mail deletion, moving a mail to a different folder, folder creation, etc. The mail activity log is a log of the user's 114 activities, like read a mail, delete a mail, move a mail to a different folder, and so on, on the mails in the user's 114 personal folders. For example, the user 114 travels 318 to the second location 322 and accesses an electronic mail message at the local multi-server 310 via the telephone 314, listens to a synthesized speech version of the message, and then the user 114 deletes the message. The mail manipulations of opening (reading) the message and deleting the message are recorded and are played back on the local multi-server 308 as well as the home local multi-server 304.

When the roaming period ends, each roamed local multi-server 308, 310 performs a cleanup of the user 114 storage. The user's 114 emails and other messages and personal data, and the roaming profile of the user 114, that were copied to the roamed local multi-servers 308, 310 for the roaming are deleted. The mini-profile for the user 114 is preferably retained at all local multi-servers. Records of the user's 114 billing activities for the roaming period on the roamed local multi-server 308, 310 are forwarded from the servers 308, 310 to the home local multi-server 304. The home local multi-server 304 is then responsible for tabulating and sending the final bill for the roamed local multi-servers 308,310.

Telephone Exchange Level Integration

Typically, when a person does not respond to a telephone call from a caller when the person is away from the phone, the caller leaves a voice mail message on an answering machine. The intended recipient of the voice mail usually must call a home telephone number to receive the mail. This is not a convenient option because the recipient has to call home at regular intervals to retrieve the message(s). In the case of retrieving voice mail messages from a voice mail service, the voice mail messages are accessed separately from other types of messages, such as facsimile transmissions, or electronic mail messages. It would be convenient and desirable if the voice mail message could be retrieved along with other types of messages from one single location.

Preferably, the MIE network is organized so that a telephone call to a user 114 home telephone number is automatically forwarded to the telephony server 404 at the multi-server 400, for example the home local multi-server 118-1, 304 of FIGS. 1 and 3, if the intended recipient, the user 114, does not pick up the telephone call. The telephony server 404 can then save the voice mail message in the database 412. This voice mail message can then be accessed either via the telephone by calling the telephony server 404 or from the Web via the Web server 402. Preferably, the voice mail message may also be forwarded to any e-mail addresses specified by the user 114. Preferably, the user 114 can also opt to get notified that he/she has a voice mail message waiting for him/her. This methodology provides the integration of global unified messaging MIE system with the telephone numbers of the subscribers to/users 114 of the MIE system through telephone exchange 408 level integration.

Figure 5:
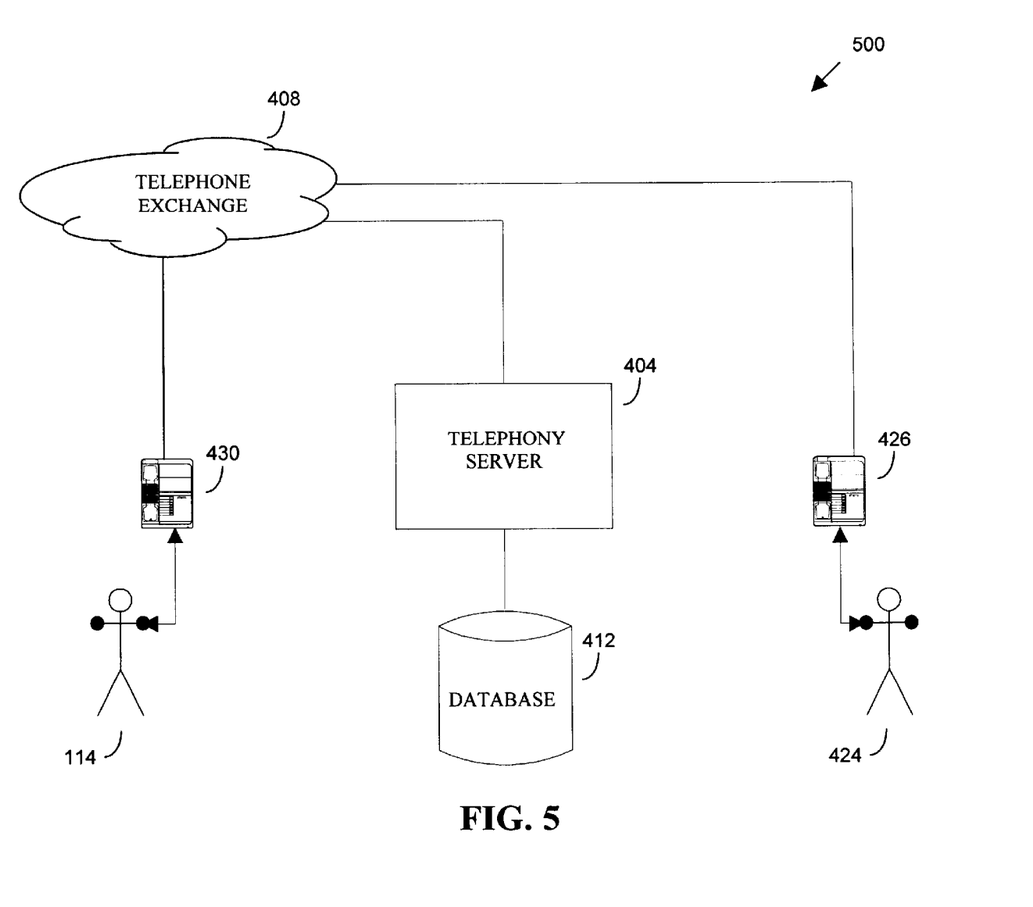
FIG. 5 is a block diagram illustrating an exemplary telephony server of the exemplary multi-server of FIG. 4 from a message forwarding feature perspective.

Referring now to FIG. 5, it is a block diagram illustrating an exemplary telephony server 404 of the exemplary multi-server 400 of FIG. 4 from a message forwarding feature perspective. The telephony server 404 communicates with the database 412 of FIG. 4. According to an exemplary scenario, a caller 424 uses the telephone 426 to call a user 114 at the user's 114 telephone number. The telephone exchange 408 connects the call to the user's 114 home telephone 430. The user's 114 home telephone 430 rings. If the user 114 does not want to answer, or is away from, the telephone 430, the telephone exchange 408 automatically forwards the telephone call to the telephony server 404. The telephone number of the user 114/MIE subscriber is forwarded to the telephony server 404 along with the forwarding call signal. The telephony server 404 identifies the user 114 based on the forwarded telephone number, and prompts the caller 424 to leave a voice mail for the user 114. Assuming that the caller 424 elects to leave a voice mail message for the user 114, the telephony server 404 receives the voice mail message and captures the voice mail by storing the message in the database 412. The user 114 can then retrieve the voice mail message by signing on to the MIE system. The user 114 can access the voice mail message from anywhere in the world via the Web and the Web server 402, for example. When this feature is integrated as part of the global distribution system 100 of the MIE system, voice mail messages are available to a roaming user 114 at the cost of a local telephone call from virtually anywhere in the world that the service is provided.

For handling facsimile (fax) transmissions, the telephone exchange 408 level integration provides a virtual fax machine functionality. If the caller 424 attempts to send a fax to the user 114, the telephone exchange 408 switch detects the fax tone and forwards the call quietly to the telephony server 404, which is in communication with the facsimile conversion server 414 and the database 412. The telephony server 404 records the fax data and the fax is stored in the database 412 so that the user 114 may view the fax document on the Web or may choose to listen to the contents of the fax from a telephone.

Internationalization Of Unified Messaging Services Via The Web

According to the presently preferred embodiments, a Web server 402 is provided that serves users 114 with choices of different languages and that presents a user interface in a user's 114 language of choice.

Figure 6:
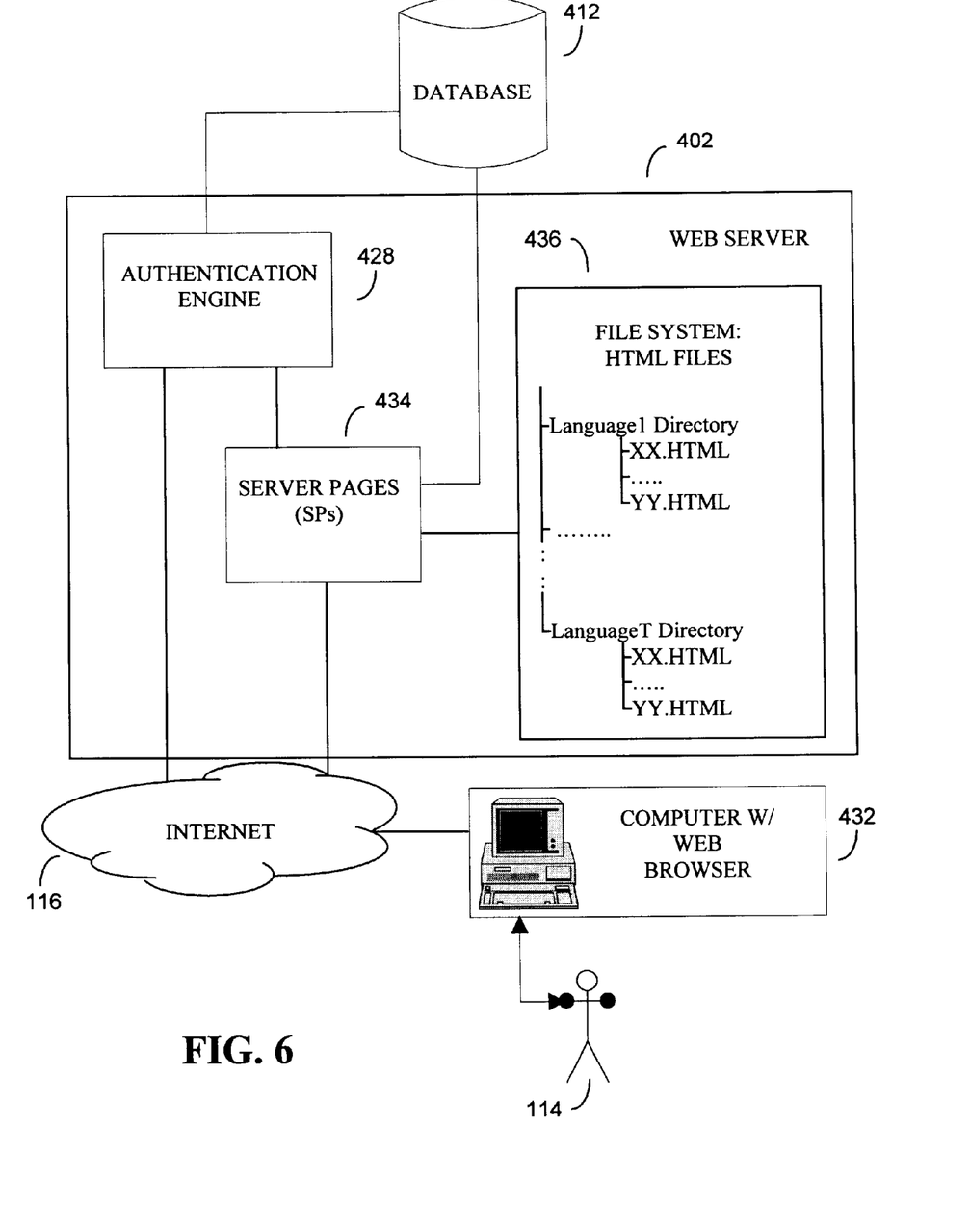
FIG. 6 is a block diagram illustrating an exemplary Web server of the exemplary multi-server of FIG. 4 from a internationalization feature perspective.

Referring now to FIG. 6, it is a block diagram illustrating an exemplary Web server 402 of the exemplary multi-server 400 of FIG. 4 from a internationalization feature perspective. The Web server 402 includes an authentication engine 428, server pages 434 in a server page directory, and a file system 436 that includes HTML files. The Web server 402 is in communication with the database 412.

An administrator 106 creates language directories in the file system 436 and places HTML files that correspond to different languages in the corresponding language directories. During the registration process with the domain multi-server, via the Internet 116, a user 114 specifies the locale of their choice by selecting from one of several locales supported by the Web server 402. A locale is a combination of a language code and a language country code. There could be more than one locale for a specific language. For example, the English language in the United States (U.S.) is treated differently that the English language in the United Kingdom (U.K.), for purposes of the MIE system, and therefore one locale will be English/U.S. and another locale will be English/U.K.

In a presently preferred embodiment, when a user 114 contacts the Web server 402, the first Web page displayed to the user 114 is displayed in the locale that is the default locale for that Web server 402. For example, in the United States, the default locale would generally be English/U.S., while in Japan, the default locale would generally be Japanese/Japan. A user 114 can select a different locale by selecting from a list of supported locales. The next Web page will be displayed to the user 114 in the charset that is specific to the locale selected by the user 114.

In a typical interaction between the user 114 at a computer with Web browser 432 with the Web server 402, the user 114 identifies himself/herself by entering a user id and password at a log in or sign on form displayed on the user's 114 Web browser. Once the authentication engine 428 on the Web server 402 authenticates the user, the Web server 402 preferably causes all subsequent Web pages during that user 114 session to be displayed in the locale as selected by the user 114 during the registration process. Preferably, the authentication engine 428 includes a Java servlet to authenticate the user 114 and the server pages (SPs) 434 are preferably Java Server Pages (JSPs) 434, although other programs, applets, application files may be used as suitable.

The JSP directory contains JSP files 434. The JSP files 434 contain Java code that is invoked to extract user 114 and other non-user 114 specific data from the database 412. The JSP pages 434 also contain statements that assign the data to Java script variables. Under the JSP directory and within the file system 436 there exist several sub-directories, one for each language supported by the Web server 402. Each of these subdirectories contains HTML files for the specific language. The file names are preferably maintained the same for all languages. For example, if there is a file named welcome.html under the English sub directory, then there will also be another file by the same name under the Japanese sub-directory, assuming that the Web server 402 supports both English and Japanese. The code in the JSP 434 outputs an HTML file from one of these directories depending on the locale of the user 114 requesting the page at their Web browser on the computer 432. The content charset is specified in the JSP 434. The Java Script method that is invoked on loading the HTML form, preferably performs the task of, for example, populating any dropdown boxes on the Web page and setting initial values for all controls.

Error and information messages are stored in resource bundles. There is one such resource bundle for each language supported by the Web server 402. Based on the language of the user 114, the code in the JSPs 434, picks an error or information message in the resource bundle that corresponds to the language code from the locale for that user 114.

According to an exemplary scenario, the user 114 enters the URL for the Web server 402 into the Web browser on the computer 432. A Java servlet 428 is invoked to authenticate the user 114, the user 114 signs on and the user's effective request for a Web page to be displayed is forwarded by the Java servlet 428 to a JSP 434. The data from the user 114 is captured in the user 114 content charset and is forwarded from the Java servlet 428 to the database 412. The code in the JSP 434 executes to retrieve the data in the user 114 content charset from the database 412 and sets Java Script variables containing the user 114 data. The code in the JSP 434 continues executing to load an HTML file under a directory that corresponds to the user's 114 language of choice. The JSP 434 identifies the language directory in the file system 436 based on the locale of the user 114. The code JSP 434 then mixes the HTML content from the HTML file with the Java Script variables user 114 data, and outputs the resulting HTML file(s) to the user's 114 Web browser via the Internet 116.

Internationalization Of Unified Messaging Services Via The Telephone

According to the presently preferred embodiments, a telephony server 402 is provided that serves users 114 with choices of different languages and that plays voice prompts and outputs text over a telephone in a user's 114 language of choice.

Figure 7:
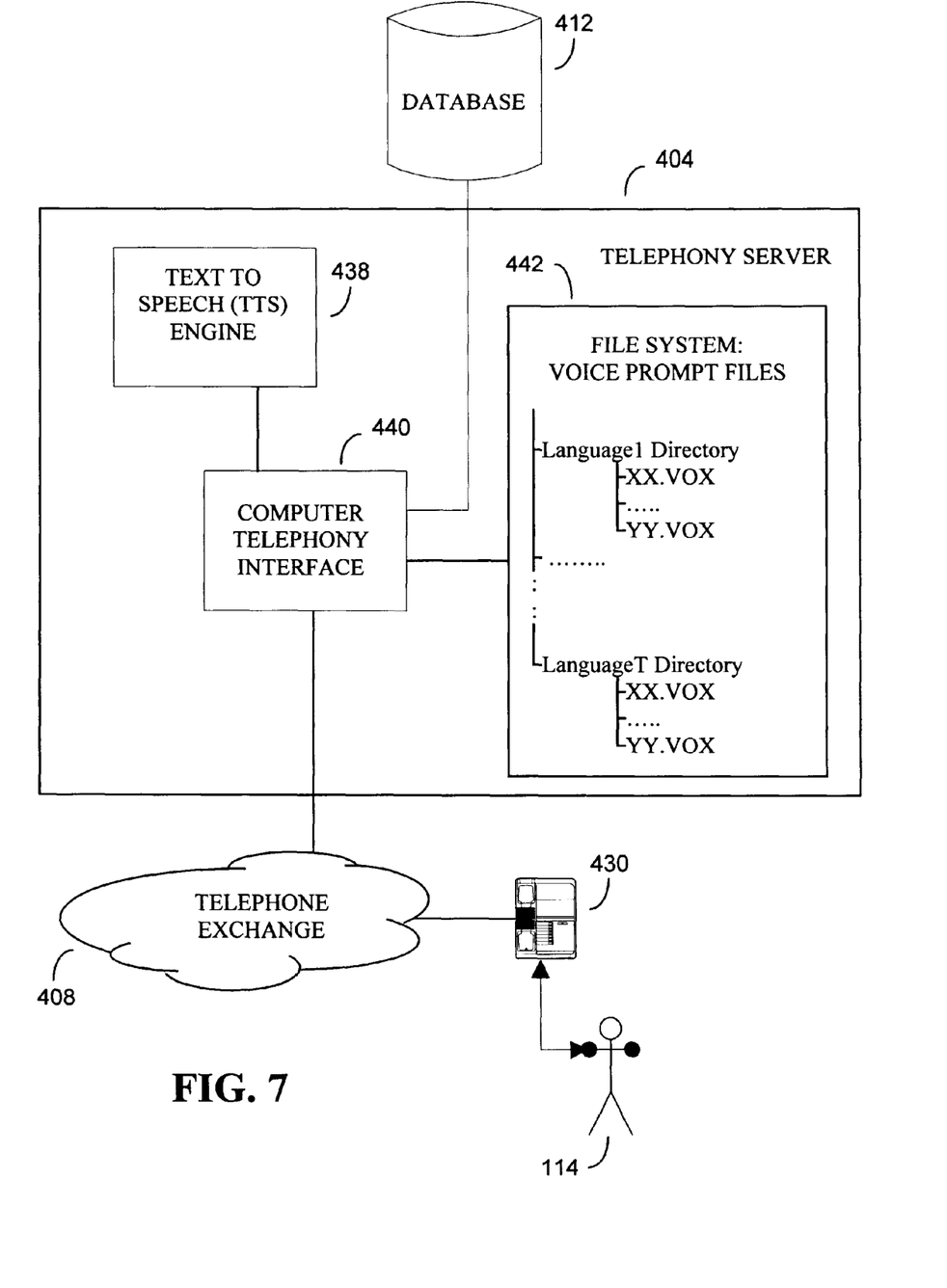
FIG. 7 is a block diagram illustrating the exemplary telephony server of the exemplary multi-server of FIG. 4 from a internationalization feature perspective.

Referring now to FIG. 7, it is a block diagram illustrating an exemplary telephony server 404 of the exemplary multi-server 400 of FIG. 4 from a internationalization feature perspective. The telephony server 404 includes a computer telephony interface 440, one or more text to speech (TTS) engines 438, and a file system 442 that includes VOX files. The telephony server 404 is in communication with the database 412.

An administrator 106 creates language directories in the file system 442 and places voice prompt VOX files that correspond to different languages in the corresponding language directories. During the registration process with the domain multi-server, via the Internet 116, a user 114 specifies the locale of their choice by selecting from one of several locales supported by the telephony server 404. As described above, a locale is a combination of a language code and a language country code. There could be more than one locale for a specific language. For example, the English language in the United States (U.S.) is treated differently that the English language in the United Kingdom (U.K.), for purposes of the MIE system, and therefore one locale will be English/U.S. and another locale will be English/U.K.

In a presently preferred embodiment, when a user 114 calls the telephony server 404 via the telephone 430, the initial voice prompts are played in the default language of the telephony server 404 until the time that the user 114 actually signs on to the telephony server 404. For example, in the United States, the default locale would generally be English/U.S. with English being the default language, while in Japan, the default locale would generally be Japanese/Japan with Japanese being the default language. Once the user 114 identifies himself/herself by signing on, the subsequent voice prompts are played in the user's 114 language of choice selected at the time of registration.

The file system 442 of the telephony server 404 contains a sub directory named, for example, PromptFiles. Under this directory, there exists one subdirectory for each locale supported by the telephony server 404. Each of these sub-directories contains voice data files, for example, VOX files, for a specific locale. The file names are preferably maintained the same for all languages. For example, if there is a file named welcome.vox under the English sub directory, then there will also be another file by the same name under the Japanese sub-directory, assuming that the telephony server 404 supports both English and Japanese.

When reading an electronic mail message, for example, the telephony server 404 passes the message through one of the TTS engines 438. The TTS engine that is selected is based on the locale of the user 114. If the locale of the user 114 is Japanese, then electronic mail messages will be passed through the Japanese TTS engine 438 and the synthesized voice output that is played to the user 114 is in Japanese.

According to an exemplary scenario, the user 114 inputs the telephone number of the home local multi-server, or the roamed local multi-server at the telephone 430 and is connected to the telephony server 404 and the computer telephony interface 440 by the telephone exchange 408. The computer telephony interface 440 acts to authenticate the user 114, the user 114 signs on, and the computer telephony interface retrieves the user's 114 information and messages from the database 412 for processing. The computer telephony interface 440 operates to load one or more voice prompt VOX files under a directory that corresponds to the user's 114 language of choice. The computer telephony interface 440 identifies the language directory in the file system 442 based on the locale of the user 114. The computer telephony interface 440 also passes the dynamic text data for the user 114 to the TTS engine 438 that corresponds to the locale, and thus the language, of the user 114. The appropriate TTS engine 438 processes the input text from the computer telephony interface 440 and the database 412 and outputs synthesized voice data. The computer telephony interface 440 then plays, in the designated language of the user 114, the voice prompt files from the file system 442 intermingled with the synthesized voice data output from the TTS engine 438 to the user 114 at the telephone 430.

Voice Portal Services Via The Telephone For International Roaming

International travelers often need access to local information in their native language. This local information is often difficult for the international traveler to obtain.

According to the presently preferred embodiments, a telephony server 402 is provided that acts as a voice portal to serve roaming users 114. The voice portal 402 solves the typical problems faced by international travelers who often cannot speak or understand the language spoken in the foreign country they are visiting. The voice portal 402 plays voice prompts and outputs text over a telephone in a user's 114 language of choice in order to navigate the user 114 to the piece of content that the user 114 seeks. The voice portal 402 facilitates the user's 114 access to such content through interactive voice response. Some examples of such content include information regarding the local weather, local restaurants, local lodging, and directions, although these examples are not exhaustive and any suitable content may be provided by the telephony server 402 acting as a voice portal 402.

As described above, an administrator 106 creates language directories in the file system 442 and places voice prompt VOX files that correspond to different languages in the corresponding language directories. During the registration process with the domain multi-server, via: the Internet 116, a user 114 specifies the locale of their choice by selecting from one of several locales supported by the telephony server 404. This user 114 locale is used by the voice portal 404 to determine the user's 114 language of choice when the user 114 is roaming.

According to an exemplary scenario, while traveling internationally the roaming user 114 inputs the telephone number of the roamed local multi-server at a telephone 430 located in the country where the user 114 is roaming. In so doing, the user 114 is connected to the telephony server/voice portal 404 and the computer telephony interface 440 by a local telephone exchange 408. The computer telephony interface 440 acts to authenticate the roaming user 114, the user 114 signs on, and the computer telephony interface 440 obtains user 114 information, including the user 114 locale from the database 412. The computer telephony interface 440 operates to load one or more voice prompt VOX files under a directory that corresponds to the user's 114 language of choice and plays the files to the user 114. The computer telephony interface 440 identifies the language directory in the file system 442 based on the locale of the user 114. The computer telephony interface 440 plays the voice prompt files to the user 114. Then, according to the example, the roaming user 114 responds by speaking into the telephone 430 in his/her language of choice and make a request to the voice portal 404. The computer telephony interface 440 recognizes the spoken words and processes the user's 114 request, and serves the request by retrieving the desired content either from the database 412 or from the Internet 116 for processing. The computer telephony interface 440 again operates to load one or more voice prompt VOX files under a directory that corresponds to the user's 114 language of choice. The computer telephony interface 440 also passes any textual output of the content to the TTS engine 438 that corresponds to the locale, and thus the language, of the user 114. The appropriate TTS engine 438 processes the input text from the computer telephony interface 440 and the database 412 and/or the Internet 116 and outputs the content as synthesized voice data. The computer telephony interface 440 then plays, in the designated language of the user 114, the voice prompt files from the file system 442 intermingled with the synthesized voice data output from the TTS engine 438 to the roaming user 114 at the telephone 430. In this way, the user 114 is provided with any requested content supported by the voice portal 404 in his/her designated language for the price of a local telephone call.

As used herein, a computing device is intended to refer broadly to any device that allows a user to communicate with a network via the Internet and the Web. Preferably, the computing device includes a Web browser, a user interface, a user input interface, and some form of mass data storage device.

As used herein, a telephonic device is intended to refer broadly to any device that allows a user to speak into an interface on the device and to hear or to read a reply from another or the same interface on the device. In certain contexts, the device may be capable of connecting to the privately switched telephone system (PSTN) or another telephone exchange, or a communications network such as a wireless communications network, to communicate with, for example, a telephony server, or other computer telephony interface device. In certain contexts, the device may be capable of making a telephone call. For example, the telephonic device may be a conventional telephone with a handset, a cellular telephone, another handheld device, a hands-free speakerphone, or any other device that satisfies the conditions above and is suitable for the particular application.

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method of cooperating with a local telephone exchange to provide a user with global access to messages, comprising:

storing telephone numbers of users;

receiving a telephone call forwarded from the local telephone exchange, the telephone call having a destination telephone number that is local to that local telephone exchange and originating from a calling party;

comparing the destination telephone number with the telephone numbers;

if the destination telephone number matches one of the telephone numbers; identifying a user corresponding to the destination telephone number; prompting the calling party to leave a voice mail message for the user; storing the voice mail message in a first database; and granting the user access to the voice mail message;

registering the user with a roaming server associated with a remote telephone exchange that is associated with a geographic region different from the local telephone exchange;

distributing the stored voice mail message to a second database of the roaming server; and providing a roaming telephone number that is local to the remote telephone exchange by which the user can access the roaming server.

2. The method of claim 1, further comprising:

providing the telephone numbers of the users to the local telephone exchange.

3. The method of claim 1, wherein prompting the calling party to leave a voice mail message comprises:

playing a stored message recorded by the user.

4. The method of claim 1, wherein prompting the calling party to leave a voice mail message comprises:

communicating with the calling party via the local telephone exchange.

5. The method of claim 1, further comprising:

if the destination telephone number matches one of the telephone numbers;

accepting the voice mail message from the calling party.

6. The method of claim 1, further comprising:

if the destination telephone number does not match a telephone number of the telephone numbers;

forwarding the telephone call back to the local telephone exchange.

7. The method of claim 1, wherein the user accesses the voice mail message via a telephone.

8. The method of claim 1, wherein the user accesses the voice mail message via the Internet.

9. The method of claim 1, wherein granting the user access to the voice mail message comprises:

sending a notification attempt to the user to inform the user that the voice mail message is present.

10. The method of claim 1, wherein granting the user access to the voice mail message comprises:

forwarding the voice mail message to an electronic mail address of the user.

11. The method of claim 1, wherein a plurality of types of messages are stored in the first database.

12. The method of claim 11, where the messages comprise one or more of electronic mail messages and facsimile messages.

13. The method of claim 1, wherein the local telephone exchange comprises one or more of a telephone switch, a portion of the Public Switched Telephone Network (PSTN), and a private branch exchange (PBX).

14. An apparatus for cooperating with a local telephone exchange to provide a user with global access to messages, comprising:

means for storing telephone numbers of users;

means for receiving a telephone call forwarded from the local telephone exchange, the telephone call having a destination telephone number that is local to the local telephone exchange and originating from a calling party;

means for comparing the destination telephone number with the telephone numbers;

means for identifying a user corresponding to the destination telephone number if the destination telephone number matches one of the telephone numbers;

means for prompting the calling party to leave a voice mail message for the user;

means for storing the voice mail message;

means for granting the user access to the voice mail message;

means for registering the user with a roaming server associated with a remote telephone exchange that is associated with a geographic region different from the local telephone exchange;

means for distributing the stored voice mail message to the roaming server; and means for answering a roaming telephone number that is local to the remote telephone exchange by which the user can access the roaming server.

15. A method of cooperating with a local telephone exchange to provide a user with global access to messages, comprising:

storing facsimile numbers of users;

receiving a facsimile call forwarded from the local telephone exchange, the facsimile call carrying facsimile data and having a destination facsimile number that is local to the local telephone exchange;

comparing the destination facsimile number with the facsimile numbers;

if the destination facsimile number matches one of the facsimile numbers;

identifying a user corresponding to the destination facsimile number;

formatting the facsimile data into a facsimile message;

storing the facsimile message in a first database; and granting the user access to the facsimile message;

registering the user with a roaming server associated with a remote telephone exchange that is associated with a geographic region different from the local telephone exchange;

distributing the stored facsimile message to a second database of the roaming server; and providing a roaming telephone number that is local to the remote telephone exchange by which the user can access the roaming server.

16. The method of claim 15, further comprising:

providing the facsimile numbers of the users to the local telephone exchange.

17. The method of claim 15, further comprising:

if the destination facsimile number matches one of the facsimile numbers;

accepting the facsimile data from the facsimile call.

18. The method of claim 15, further comprising:

if the destination telephone number does not match a telephone number of the telephone numbers;

forwarding the facsimile call back to the local telephone exchange.

19. The method of claim 15, wherein the facsimile message is in the form of text.

20. The method of claim 15, wherein the facsimile message is in the form of speech.

* * * * *